United States Patent Office 2,868,847
Patented Jan. 13, 1959

2,868,847

HYDROGENATION OF MONO- AND DISACCHARIDES TO POLYOLS

Gertrude Gilman Boyers, Flushing, N. Y., assignor to Engelhard Industries, Inc., a corporation of New Jersey No Drawing. Application October 5, 1956
Serial No. 614,082

10 Claims. (Cl. 260—635)

This invention relates to the catalytic hydrogenation of sugars and more particularly to the hydrogenation of saccharides to produce polyhydric alcohols.

In the catalytic hydrogenation of saccharides for the production of polyhydric alcohols, the efficiency of the reaction and the yield of the desired end product generally depend upon critical reaction conditions and especially upon the particular catalyst employed. Economy is an important factor in the large scale hydrogenation of saccharides to polyhydric alcohols, this economy being generally conditioned upon the particular saccharide treated, the amount of catalyst required for optimum conversion, and the optimum temperatures and pressures employed in the process.

Platinum and palladium may be used as catalyst metals for the hydrogenation saccharides, and while these catalysts require less catalyst metal than nickel catalyst for equivalent hydrogenation under similar reaction conditions, neither nickel nor platinum nor palladium catalysts exhibit highly efficient conversions at reaction temperatures below about 160° C. and pressures below about 1500 p. s. i. g.

In accordance with the present invention, a process is provided for the hydrogenation of monosaccharides and polysaccharides to polyhydric alcohols in which the catalyst employed is outstandingly efficient, even using hydrogenation pressures below 1500 p. s. i. g., and temperatures below 160° C. Further, using the process of the invention, certain sugars such as dextrose may be efficiently hydrogenated at temperatures below caramelization temperatures, i. e., below about 145° C. The process of the present invention may be conducted in either a batchwise or continuous manner.

The catalyst employed in the process of the invention is a ruthenium containing catalyst and may be, for example, elemental ruthenium or oxides thereof such as the sesquioxide, dioxide and tetroxide, or salts of ruthenium such as barium perruthenite, sodium perruthenite, and the like; ruthenates such as magnesium, strontium, calcium, silver, barium, potassium and sodium ruthenates; perruthenates, such as sodium and potassium perruthenates, and the like; ruthenium halides such as ruthenium dichloride, ruthenium trichloride, ruthenium tetrachloride, ruthenium pentafluoride and the like; ruthenium sulfides such as ruthenium disulfide; and chloro salts of ruthenium, such as potassium chloro perruthenate. Of these catalysts, elemental ruthenium and ruthenium oxides are preferred due to the unusual efficacy which they possess as catalysts in the process of the invention.

Generally, the process may be operated at pressures in the range of about 100 p. s. i. g. to about 1500 p. s. i. g.; higher pressures are operable but result in no process advantage The reaction temperature may be in the range of about 50 to 400° C., preferably about 80 to 200° C. Temperatures in excess of 200° C. are useful in continuous process operations with those saccharides which do not have as great a tendency, relatively speaking, to caramelize.

The catalyst metal is generally used in conjunction with an inert catalyst support, such as carbon, alumina, silica, kieselguhr, synthetic gel, diatomaceous earth, and the like. In addition to the catalysts previously described, other suitable catalysts, including a combination of elemental ruthenium and/or ruthenium oxide with a minor amount of another platinum group metal or oxide thereof such as platinum or palladium, or the oxides thereof, may be used. In the case of ruthenium containing catalysts in which the elemental ruthenium or oxide thereof is in admixture with another platinum group metal or oxide thereof, the ruthenium constitutes about 5 to 95 percent by weight, preferably at least about 50 percent by weight, of the catalytically active metal content of the catalyst, i. e., that portion of the catalyst other than the catalyst support.

The preferred supported catalysts include an elemental ruthenium or ruthenium oxide content from about 0.1 to about 10 percent by weight of the catalyst, but catalysts having a higher active metal content may be used if desired.

The ruthenium containing catalysts of this invention possess outstanding efficacy even at comparatively moderate temperatures and pressures and result in substantially 100 percent conversion of saccharides to polyhydric alcohols. The catalyst may be present in the reaction mixture in a concentration as low as about 0.0025 to about 0.05 percent by weight of active catalyst component, calculated as elemental ruthenium, based upon the weight of the saccharide converted. Further, the catalysts of this invention may be used in the hydrogenation processes of the invention without intermediate regeneration.

The catalysts may be prepared in accordance with known methods for preparing such catalysts; for example, the catalyst support may be first coated or impregnated with a solution of a ruthenium metal salt, after which the impregnated material is dried and heated to the decomposition temperature while being contacted with a moving stream of a reducing gas.

Generally speaking, in the process of the invention, when operated as a batchwise process, the sugar to be hydrogenated is placed in the liner of an autoclave, and water and catalyst are added thereto. The liner is then closed and placed in a rocking autoclave, then pressured with hydrogen to the desired operating pressure, after which the autoclave is heated and rocked. At the expiration of desired reaction period, the autoclave is cooled to room temperature and vented, after which the reaction mixture is removed. The catalyst is separated from the reaction mixture and the reduced sugar is separated from the unreduced sugar. The time of reaction may be in the range of a few minutes to about 24 hours or more, preferably about one to six hours.

The invention will be further illustrated by reference to the following specific examples:

EXAMPLE I

A series of runs was made in which dextrose was hydrogenated to sorbitol, using various quantities of a catalyst consisting of 5 percent elemental ruthenium on carbon. In these runs, the sugar to be hydrogenated was weighed into a glass autoclave liner, measuring 2¼ x 6 inches, after which 30 to 50 ml. of distilled water was added. The desired quantity of catalyst was accurately weighed and brushed into the liner, after which the liner was closed and placed in a Parr high pressure rocking type autoclave, having a capacity of 500 ml. After the bomb was assembled, it was pressured with hydrogen to the desired operating pressure and the autoclave heater and rocking motor were started. The reaction time was considered to begin when the autoclave attained the desired operating temperature. At the expiration of the desired reaction period, the rocking motor and heater were shut off, the bomb was cooled to room temperature and vented, after which the autoclave was opened, and the glass liner containing the catalyst and reaction mixture was removed. The catalyst was filtered off, and the remaining reaction mixture was diluted in a volumetric flask. The quantity of unreduced sugar—if any—which remained was determined quantitatively with Fehling's solution using an aliquot portion of the solution in the volumetric flask.

The operating conditions and results obtained are listed in Table I below:

Table I

| Grams of 5% Ru on Carbon Used | Grams of Sugar Used | Pressure, p. s. i. g. | Temperature, °C. | Time, Hours | Percent Hydrogenation |
|---|---|---|---|---|---|
| 0.100 | 9 | 80 | 130 | 6 | 100 |
| 0.200 | 37 | 80 | 130 | 24 | 100 |
| 0.100 | 90 | 200 | 135 | [1] 24 | 100 |
| 0.100 | 45 | 200 | 130 | 10 | 100 |
| 0.050 | 35 | 200 | 140 | 16 | 100 |
| 0.025 | 25 | 500 | 130 | 4 | 100 |
| 0.025 | 35 | 500 | 130 | 16 | 100 |
| 0.025 | 40 | 1,000 | 130 | 4 | 100 |
| 0.025 | 55 | 1,000 | 130 | 14 | 100 |
| 0.025 | 80 | 1,000 | 130 | 24 | 100 |

[1] Catalyst was re-used twice.

EXAMPLE II

In this example, the general procedure of Example I above was followed, except that the catalysts used were ruthenium on an alumina support, and a combination of ruthenium and platinum on carbon or alumina supports. The sugar hydrogenated was dextrose. The reaction conditions and results obtained were as follows:

Table II

| Amt. of Catalyst | Gm. of Sugar, Dextrose | Pressure, p. s. i. g. | Average Temp., °C. | Percent Hydrogenation |
|---|---|---|---|---|
| 0.05 gm. 5% Ru on Al₂O₃ | 50 | 1,000 | 130 | 96.3 |
| 0.05 gm. 1% Pt, 4% Ru on C | 50 | 1,000 | 135 | over 99.5 |
| Do | 50 | 1,000 | 120 | 98.53 |
| 0.025 gm. 1% Pt, 4% Ru on C | 50 | 1,000 | 140 | 97.55 |
| 0.05 gm. 1% Pt, 4% Ru on C | 70 | 900 | 150 | over 99 |

EXAMPLE III

This example was performed following the general procedure of Example I above. The sugars hydrogenated were sucrose, levulose, maltose and lactose, and the catalysts used were ruthenium on carbon, or a combination of ruthenium and palladium on carbon. In the case of sucrose and lactose, these disaccharides were hydrolyzed and hydrogenated to the appropriate hexitols during reaction, but in the case of maltose, maltitol was more easily formed.

The operating conditions and results obtained were as follows:

| Catalyst | Sugar | Pressure, p. s. i. g. | Time in Hours | Temp., °C. | Percent Hydrogenation |
|---|---|---|---|---|---|
| 0.2 gm. 5% Ru on C | 50 gm. sucrose | 1,000 | 2½ | 150 | 100 |
| Do | do | 1,000 | 6½ | 110 | 100 |
| 0.2 gm 4% Ru, 1% Pd on C | do | 1,020 | 3 | 150 | 97 |
| Do | do | 1,000 | 5 | 110 | 100 |
| 0.1 gm. 5% Ru on C | 25 gm. levulose | 950 | 4 | 150 | 100 |
| 0.2 gm. 5% Ru on C | 50 gm. maltose | 1,000 | 5 | 150 | 95 |
| Do | 50 gm. lactose | 1,000 | 5 | 150 | 100 |

EXAMPLE IV

This example is performed following the general procedure used in Example I above. Ten milligrams of ruthenium dioxide are used as a catalyst for the hydrogenation of fifty grams of dextrose. The hydrogen pressure used is 200 p. s. i. g. at a temperature of 135° C. After ten hours, the hydrogen consumption stops, and when the solution is removed from the autoclave, it is found to be 100 percent hydrogenated.

EXAMPLE V

Following the general procedure of Example I above, dextrose was hydrogenated using catalysts consisting of platinum or palladium on carbon, and it will be seen that the use of these catalysts, under similar to reaction conditions, resulted in a substantial loss of efficiency as compared to ruthenium containing catalysts.

The operating conditions and results obtained are as follows:

| Catalyst | Sugar | Pressure, p. s. i. g. | Temp., °C. | Percent Hydrogenation |
|---|---|---|---|---|
| 1 gm. 5% Pt on C | 50 gm. dextrose. | 1,000 | 150 | 0 |
| Do | 10 gm. dextrose. | 1,000 | 150 | 51.9 |
| 1 gm. 5% Pd on C | do | 1,000 | 150 | 87 |
| Do | 20 gm. dextrose. | 1,000 | 150 | 39 |

It is apparent from the foregoing table that even with 10 to 50 times the amount of platinum or palladium catalyst, as compared with a ruthenium containing catalyst, hydrogenation is not as efficient, based upon the same amount of sugar converted.

EXAMPLE VI

Following the general procedure of Example I above, 25 grams of dextrose were dissolved in 50 ml. of water, and 1 gram of Raney nickel was added thereto. This mixture was placed in an autoclave as before, and pressured to 1,000 p. s. i. g. with hydrogen. The autoclave was rocked, at a temperature of 135° C., for a period of five hours. These conditions resulted in the hydrogenation of 15.4 grams of the dextrose, which is equivalent to 61.7 percent hydrogenation. There was considerable caramelization.

From these results, it is apparent that Raney nickel is not nearly as efficacious as is a ruthenium catalyst in the hydrogenation process of the invention.

It will be obvious to those skilled in the art that many modifications may be made within the scope of the present invention without departing from the spirit thereof, and the invention includes all such modifications.

What I claim is:

1. A process for the production of a polyhydric alcohol which comprises treating a solution of a compound selected from the group consisting of mono- and disaccharides with hydrogen at superatmospheric pressure and a temperature in the range of about 50 to 400° C., in the presence of a catalyst selected from the group consisting of ruthenium and a compound thereof.

2. A process according to claim 1 in which the saccharide is treated in an aqueous solution.

3. A process according to claim 1 in which the ruthenium content of the catalyst is at least about 50 percent by weight of the catalytically active metal content of the catalyst.

4. A process according to claim 1 in which the treatment is effected at an elevated temperature and pressure.

5. A process according to claim 1 in which the treatment is effected at a temperature in the range of about 80 to 200° C. and a pressure in the range of about 100 to 1500 p. s. i. g.

6. A process according to claim 1 in which the catalyst comprises ruthenium metal on a support.

7. A process according to claim 1 in which the catalyst comprises ruthenium in admixture with another platinum group metal.

8. A process according to claim 1 in which the catalyst is ruthenium oxide.

9. A process for the production of a polyhydric alcohol which comprises treating a solution of a compound selected from the group consisting of mono- and disaccharides with hydrogen at a pressure in the range of about 100 to 1500 p. s. i. g. and a temperature in the range of about 80 to 200° C., in the presence of a ruthenium catalyst.

10. A process for the production of a polyhydric alcohol which comprises treating a solution of a compound selected from the group consisting of mono- and disaccharides with hydrogen at a pressure in the range of about 100 to 1500 p. s. i. g. and a temperature in the range of about 80 to 200° C., in the presence of a ruthenium oxide catalyst.

References Cited in the file of this patent

UNITED STATES PATENTS

| | | |
|---|---|---|
| 2,292,293 | Rose | Aug. 4, 1942 |
| 2,421,416 | Flexser | June 3, 1947 |
| 2,607,805 | Gresham | Aug. 19, 1952 |
| 2,607,807 | Ford | Aug. 19, 1952 |

OTHER REFERENCES

Borisov et al.: Science Reports Moscow State Univ., No. 6 (1936), pp. 347–52; Chem. Abs., vol. 32, 2414 [1].

Delepine et al.: Bull. Soc. Chim. (France) [5], vol. 4, pp. 31–49 (1937).